United States Patent
Ozue et al.

(10) Patent No.: US 6,297,631 B1
(45) Date of Patent: Oct. 2, 2001

(54) MAGNETIC SIGNAL REPRODUCING METHOD AND APPARATUS USING MAGNETO-RESISTIVE EFFECT ELEMENT WITH INCREASED SENSE CURRENT

(75) Inventors: Tadashi Ozue; Toshio Shirai; Yoshiteru Kamatani; Tomohiro Ikegami; Takehiko Saito, all of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/329,714

(22) Filed: Jun. 10, 1999

(30) Foreign Application Priority Data

Jun. 12, 1998 (JP) .................................... 10-164877

(51) Int. Cl.[7] .............................. G11B 5/39; G11B 5/255; G01R 33/09; G01R 35/00
(52) U.S. Cl. ......................... 324/210; 324/202; 324/252; 29/603.09; 360/6; 360/313
(58) Field of Search .................................. 324/202, 210, 324/212, 225, 252; 360/6, 25, 31, 65, 66, 313, 317, 319; 29/603.01, 603.09; 369/55; 365/158

(56) References Cited

U.S. PATENT DOCUMENTS 5,309,305 * 5/1994 Nepela et al. .
5,828,529 * 10/1998 Gill .

FOREIGN PATENT DOCUMENTS 4-205903 * 7/1992 (JP) .
8-36713 * 2/1996 (JP) .

* cited by examiner

*Primary Examiner*—Gerard R. Strecker
(74) *Attorney, Agent, or Firm*—Jay H. Maioli

(57) ABSTRACT

A magnetic signal reproducing apparatus which can lessen fluctuation of reproduced outputs in reproducing magnetic signals recorded in a magnetic tape by a magneto-resistance effect type magnetic head even if a magnetic tape sliding face of the magneto-resistance effect type magnetic head is abraded. A current value of a sense current when a voltage fluctuation level of the sense current caused when a magnetic field in the normal direction is applied to a magneto-resistance effect element of the magneto-resistance effect type magnetic head is equal with a voltage fluctuation level of the sense current caused when a magnetic field in the opposite direction is applied thereto is set to a predetermined value I0. Then, the current value of the sense current supplied to the magneto-resistance effect element of the magneto-resistance effect type magnetic head is set to be greater than I0 in reproducing the magnetic signals recorded in the magnetic tape.

6 Claims, 9 Drawing Sheets

MAGNETIC SIGNAL REPRODUCING METHOD AND APPARATUS USING MAGNETO-RESISTIVE EFFECT ELEMENT WITH INCREASED SENSE CURRENT

BACKGROUND OF THE INVENTION

1. Field of the Invention

The present invention relates to a magnetic signal reproducing apparatus and, a magnetic signal reproducing method, for reproducing magnetic signals recorded in a magnetic tape by a magneto-resistance effect type magnetic head.

2. Description of the Related Art

A magneto-resistance effect element is a device whose resistance changes depending on the magnitude of an external magnetic field. A magneto-resistance effect type magnetic head comprising the magneto-resistance effect element as a magneto-sensitive element reproduces magnetic signals from a magnetic recording medium by detecting the changes of the resistance of the magneto-resistance effect element normally by supplying a fixed sense current to the magneto-resistance effect element and by detecting the fluctuation of voltage of the sense current.

Such a magneto-resistance effect type magnetic head produces a large reproducing output and is suited for high-density recording. Then, the magneto-resistance effect type magnetic head has come to be used widely in a hard disk unit having a high recording density. The magneto-resistance effect type magnetic head reproduces signals while floating minutely on the hard disk rotating at high speed in the hard disk unit.

Because the magneto-resistance effect type magnetic head produces the large reproduced output and is suited for the high-density recording, it is desired to be applied to a magnetic signal reproducing apparatus using a magnetic tape as a recording medium. However, the abrasion of a magnetic tape sliding face of the magneto-resistance effect type magnetic head poses a problem when the magneto-resistance effect type magnetic head is applied to the magnetic signal reproducing apparatus using the magnetic tape.

The hard disk unit causes almost no problem of abrasion because the magneto-resistance effect type magnetic head reproduces the signals while floating minutely on the hard disk rotating at high speed. However, when the magnetic tape is used as the recording medium, such problem occurs that the magnetic tape sliding face is abraded because the magneto-resistance effect type magnetic head reproduces the signals while contacting with and sliding along the magnetic tape.

The magneto-resistance effect type magnetic head reproduces the magnetic signals by supplying the fixed sense current to the magneto-resistance effect element and by detecting the fluctuation of the voltage as described above. However, when the part of the magneto-resistance effect element is abraded by sliding the magneto-resistance effect type magnetic head along the magnetic tape, the level of fluctuation of the voltage of the sense current corresponding to the signaling magnetic field from the magnetic tape changes. As a result, the reproduced output obtained from the magneto-resistance effect type magnetic head fluctuates considerably and the signals cannot be reproduced normally.

The magnetic tape sliding face of the magnetic head is very liable to be abraded because the magnetic tape slides along the magnetic head at high speed in the helical scan type magnetic signal reproducing apparatus in particular. Therefore, it has been very difficult to apply the magneto-resistance effect type magnetic head to the helical scan type magnetic signal reproducing apparatus.

SUMMARY OF THE INVENTION

The present invention has been proposed in view of such problems of the past described above and its object is to provide a magnetic signal reproducing apparatus, and a magnetic signal reproducing method, which can lessen the fluctuation of reproduced output in reproducing magnetic signals recorded in the magnetic tape by a magneto-resistance effect type magnetic head even if a magnetic tape sliding face of the magneto-resistance effect type magnetic head is abraded.

A magnetic signal reproducing apparatus of the invention comprises a magneto-resistance effect type magnetic head having a magneto-resistance effect element; and a sense current supplying section for supplying a sense current to the magneto-resistance effect element; and is characterized in that the value of a sense current supplied to the magneto-resistance effect element from the sense current supplying section is set to be greater than a value of sense current I0 where asymmetry of the magneto-resistance effect element in the initial state is zeroed.

Further, a magnetic signal reproducing method of the invention for reproducing magnetic signals recorded in a magnetic tape by a magneto-resistance effect type magnetic head which reproduces the magnetic signals by supplying a sense current to a magneto-resistance effect element and by detecting a fluctuation of the voltage of the sense current is characterized in that the value of the sense current supplied to the magneto-resistance effect element is greater than a value of sense current I0 where asymmetry in the initial state is zeroed.

According to the inventive magnetic signal reproducing apparatus and magnetic signal reproducing method described above, the current value of the sense current supplied to the magneto-resistance effect element of the magneto-resistance effect type magnetic head is set to be greater than I0 in reproducing the magnetic signals recorded in the magnetic tape. Accordingly, as the abrasion of the magnetic tape sliding face of the magneto-resistance effect type magnetic head progresses, the difference between a voltage fluctuation level of the sense current caused when the magnetic field in the normal direction is applied to the magneto-resistance effect element and a voltage fluctuation level of the sense current caused when the magnetic field in the opposite direction is applied becomes small gradually. Then, the difference is eliminated at the stage when the magnetic tape sliding face of the magneto-resistance effect type magnetic head is abraded to a certain degree. After that, the difference is widened gradually as the abrasion of the magnetic tape sliding face of the magneto-resistance effect type magnetic head progresses further.

The asymmetry will be described later. The initial state described above refers to the state of the head when it is shipped out of a factory and when the magneto-resistance effect element is not abraded almost at all.

The specific nature of the invention, as well as other objects, uses and advantages thereof, will clearly appear from the following description and from the accompanying drawings in which like numerals refers to like parts.

DESCRIPTION OF THE PREFERRED EMBODIMENTS

Preferred embodiments of the invention will be explained below in detail with reference to the drawings.

A magnetic signal reproducing apparatus of the invention uses a magnetic tape as a recording medium and may be used as a video tape recorder, an audio tape recorder, a computer data storage system or the like.

The magnetic signal reproducing apparatus of the invention will be explained below by exemplifying a helical scan type magnetic signal reproducing apparatus which records/reproduces magnetic signals by using a rotary drum.

Figure 1:
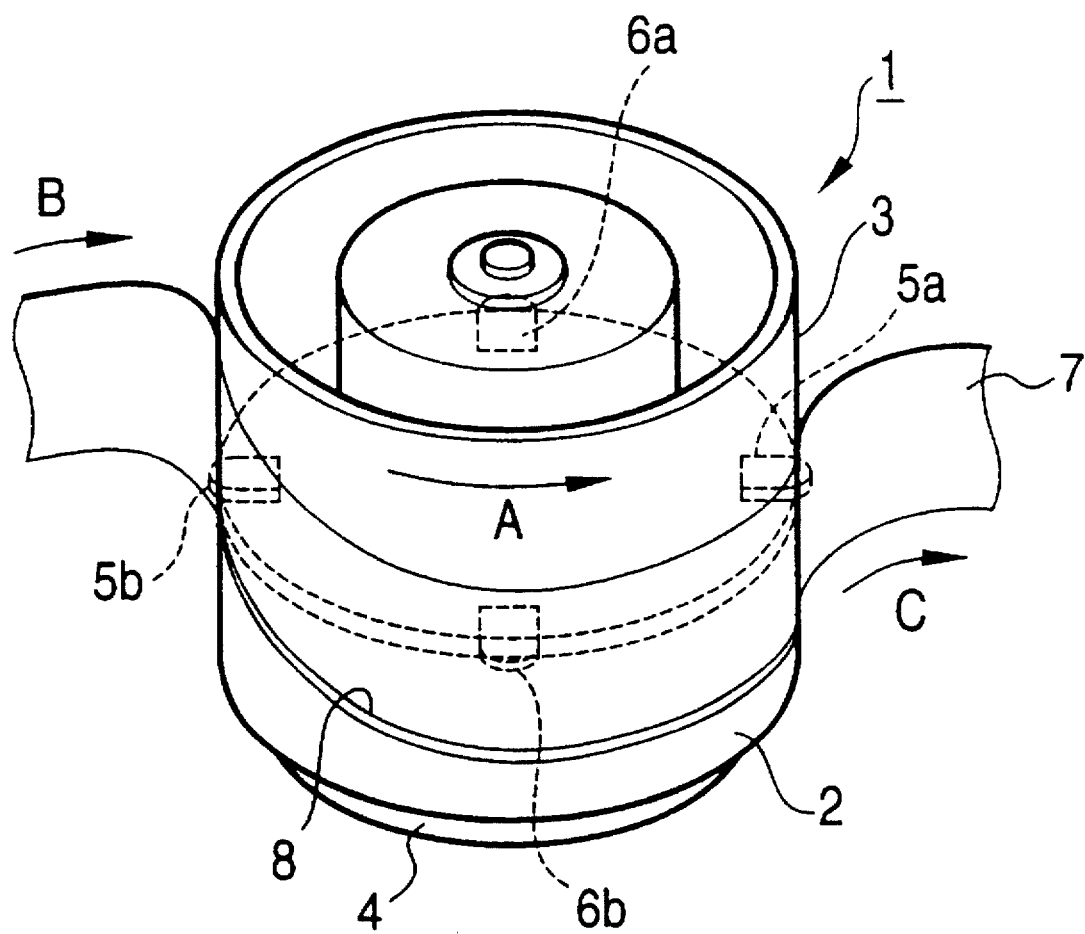
FIG. 1 is a perspective view showing an outline of one structural example of a rotary drum unit mounted in a magnetic signal reproducing apparatus to which the invention is applied.
Figure 2:
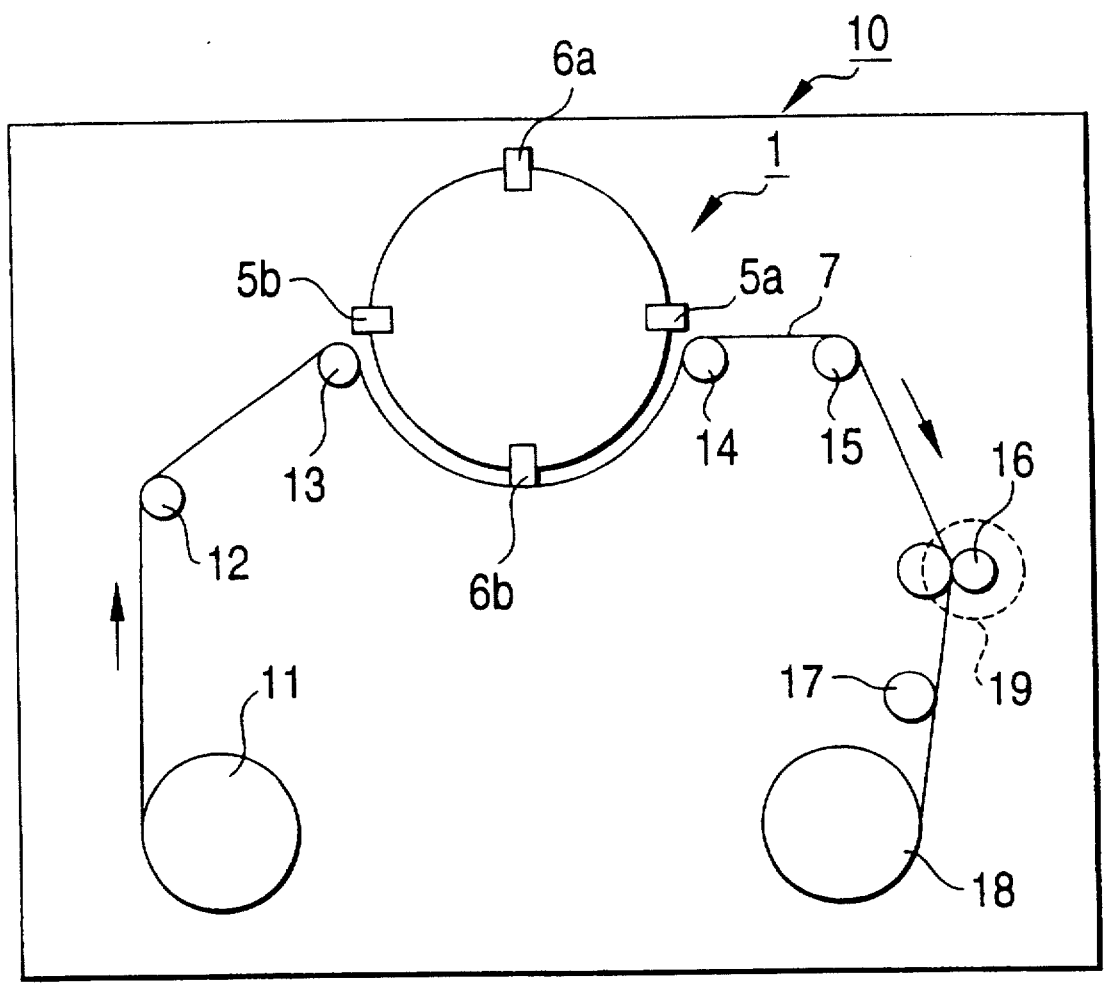
FIG. 2 is a plan view showing an outline of one structural example of a magnetic tape feeding mechanism including the rotary drum unit.

FIGS. 1 and 2 show one structural example of a rotary drum unit mounted in the magnetic signal reproducing apparatus. It is noted that FIG. 1 is a perspective view showing the outline of the rotary drum unit 1 and FIG. 2 is a plan view showing the outline of a magnetic tape feeding mechanism 10 including the rotary drum unit 1.

As shown in FIG. 1, the rotary drum unit 1 comprises a cylindrical stationary drum 2, a cylindrical rotary drum 3, a motor 4 for driving and rotating the rotary drum 3, a pair of inductive magnetic heads 5a and 5b and a pair of magneto-resistance effect type magnetic heads 6a and 6b mounted in the rotary drum 3.

The stationary drum 2 is a drum held without rotation. A lead guide section 8 is created on the side of the stationary drum 2 along the traveling direction of a magnetic tape 7. The magnetic tape 7 is run along the lead guide section 8 in recording/reproducing signals as described later. The rotary drum 3 is disposed so that its center axis coincides with that of the stationary drum 2.

The rotary drum 3 is a drum driven and rotated at predetermined rotary speed by the motor 4 in recording/reproducing signals to/from the magnetic tape 7. The rotary drum 3 is formed into the cylindrical shape having almost the equal diameter with the stationary drum 2. The pair of inductive magnetic heads 5a and 5b and the pair of magneto-resistance effect type magnetic heads 6a and 6b are mounted on the sides of the rotary drum 3 facing to the stationary drum 2.

The inductive magnetic heads 5a and 5b are recording magnetic heads in which a pair of magnetic cores are junctioned via a magnetic gap and are wound by coils and are used in recording signals to the magnetic tape 7. These inductive magnetic heads 5a and 5b are mounted in the rotary drum 3 so as to make an angle of 180° from each other with respect to the center of the rotary drum 3 and so that their magnetic gap portion protrudes out of the outer circumference of the rotary drum 3. It is noted that these inductive magnetic heads 5a and 5b are set so that their azimuth angle are opposite from each other so as to record at different angles on the magnetic tape 7.

Meanwhile, the magneto-resistance effect type magnetic heads 6a and 6b are reproducing magnetic heads comprising a magneto-resistance effect element as a magneto-sensitive element for detecting signals recorded in the magnetic tape 7 and are used in reproducing the signals from the magnetic tape 7. It is noted that the structure of these magneto-resistance effect type magnetic heads 6a and 6b will be explained later in detail.

These magneto-resistance effect type magnetic heads 6a and 6b are mounted in the rotary drum 3 so as to make an angle of 180° from each other with respect to the center of the rotary drum 3 and so that the magnetic gap portion protrudes out of the outer circumference of the rotary drum 3. It is noted that these magneto-resistance effect type magnetic heads 6a and 6b are set so that their azimuth angle are opposite from each other so as to be able to reproduce the signals recorded to the magnetic tape 7.

The magnetic signal reproducing apparatus slides the magnetic tape 7 along such rotary drum unit 1 to record/reproduce signals to/from the magnetic tape 7.

More specifically, the magnetic tape 7 is fed so as to be wound around the rotary drum unit 1 from a supply reel 11 via guide rollers 12 and 13 as shown in FIG. 2 in recording/reproducing the signals by the rotary drum unit 1. Then, the magnetic tape 7 to/from which the signals have been recorded/reproduced by the rotary drum unit 1 is fed to a take-up roller 18 via guide rollers 14 and 15, a capstan 16 and a guide roller 17. That is, the magnetic tape 7 is fed at predetermined tension and speed by the capstan 16 which is driven and rotated by a capstan motor 19 and is taken up by the take-up roller 18 via the guide roller 17.

At this time, the rotary drum 3 is driven and rotated as indicated by an arrow A in FIG. 1 by the motor 4. Meanwhile, the magnetic tape 7 is fed so as to slide obliquely with respect to the stationary drum 2 and the rotary drum 3 along the lead guide section 8 of the stationary drum 2. That is, the magnetic tape 7 is fed along the lead guide section 8 so as to slide and contact with the stationary drum 2 and the rotary drum 3 from the tape input side as indicated by an arrow B in FIG. 1 and is then fed to the tape output side as indicated by an arrow C in FIG. 1 along the tape traveling direction.

Next, the internal structure of the rotary drum unit 1 will be explained with reference to FIG. 3.

Figure 3:
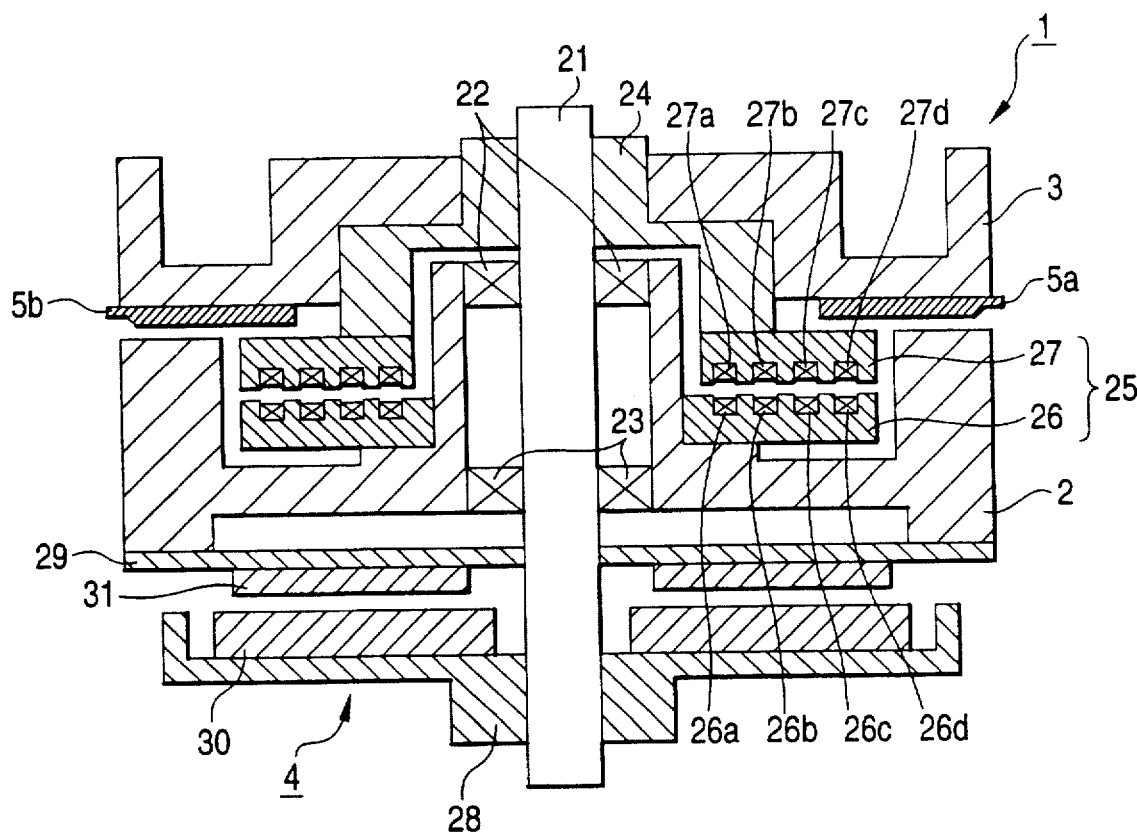
FIG. 3 is a section view showing the internal structure of the rotary drum unit.

A rotary shaft 21 is inserted through the center of the stationary drum 2 and the rotary drum 3 as shown in FIG. 3. It is noted that the stationary drum 2, the rotary drum 3 and the rotary shaft 21 are made of conductive materials and are electrically conductive. The stationary drum 2 is grounded.

Two bearings 22 and 23 are provided inside of the sleeve of the stationary drum 2 to rotatably support the rotary shaft 21 with respect to the stationary drum 2. That is, the rotary shaft 21 is rotatably supported by the bearings 22 and 23 with respect to the stationary drum 2. Meanwhile, a flange 24 is created at the inner peripheral portion of the rotary drum 3. The flange 24 is fixed to the upper end portion of the rotary shaft 21, so that the rotary drum 3 rotates as the rotary shaft 21 rotates.

A rotary transformer 25 which is a non-contact signal transmitter is disposed within the rotary drum unit 1 to transmit signals between the stationary drum 2 and the rotary drum 3. The rotary transformer 25 comprises a stator core 26 fixed to the stationary drum 2 and a rotary core 27 fixed to the rotary drum 3.

The stator core 26 and the rotary core 27 are formed into a ring centering on the rotary shaft 21 by a magnetic material such as ferrite. In the stator core 26, a pair of signal transmitting rings 26a and 26b corresponding to the pair of inductive magnetic heads 5a and 5b, a signal transmitting ring 26c corresponding to the pair of magneto-resistance effect type magnetic heads 6a and 6b and a power transmitting ring 26d for supplying electric power necessary for driving the pair of magneto-resistance effect type magnetic heads 6a and 6b are disposed concentrically. In the same manner, a pair of signal transmitting rings 27a and 27b corresponding to the pair of inductive magnetic heads 5a and 5b, a signal transmitting ring 27c corresponding to the pair of magneto-resistance effect type magnetic heads 6a and 6b and a power transmitting ring 27d for supplying electric power necessary for driving the pair of magneto-resistance effect type magnetic heads 6a and 6b are disposed concentrically in the rotary core 27.

These rings 26a, 26b, 26c, 26d, 27a, 27b, 27c and 27d are coils wound in a ring centering on the rotary shaft 21 and are disposed so that the respective rings 26a, 26b, 26c and 26d of the stator core 26 face to the respective rings 27a, 27b, 27c and 27d of the rotary core 27. Then, the rotary transformer 25 is arranged so as to transmit signals and power in non-contact between the respective rings 26a, 26b, 26c and 26d of the stator core 26 and the respective rings 27a, 27b, 27c and 27d of the rotary core 27.

The rotary drum unit 1 is also provided with the motor 4 for driving and rotating the rotary drum 3. The motor 4 comprises a rotor 28 which is a rotary part and a stator 29 which is a stationary part. The rotor 28 is fixed to the lower end portion of the rotary shaft 21 and comprises a driving magnet 30. Meanwhile, the stator 29 is fixed to the lower end portion of the stationary drum 2 and comprises a driving coil 31. The rotor 28 is driven and rotated when an electric current is supplied to the driving coil 31. Thereby, the rotary shaft 21 fixed to the rotor 28 rotates and along that, the rotary drum 3 fixed to the rotary shaft 21 rotates.

Next, the recording/reproducing operation of the rotary drum unit 1 described above will be explained with reference to FIG. 4 which shows the outline of the circuit structure of the rotary drum unit 1 and its peripheral circuit.

Figure 4:
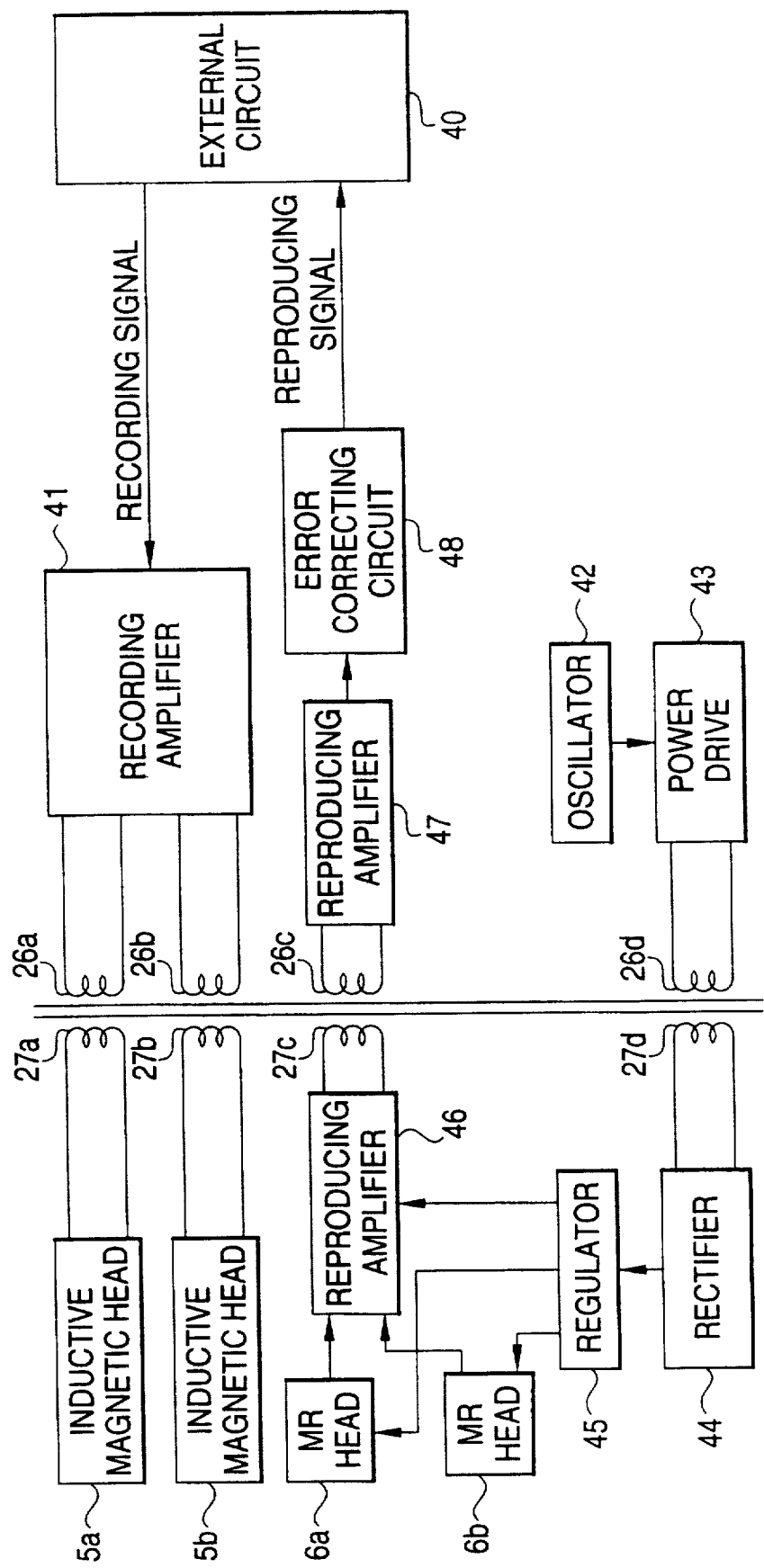
FIG. 4 is a diagram showing an outline of the circuit structure of the rotary drum unit and its peripheral circuit.

An electric current is supplied to the driving coil 31 of the motor 4 at first in recording signals to the magnetic tape 7 by using the rotary drum until described above. Thereby, the rotary drum 3 is driven and rotated. Then, recording signals are supplied from an external circuit to a recording amplifier 41 in the state when the rotary drum 3 is rotated as shown in FIG. 4.

A recording amplifier 41 amplifies the recording signal from the external circuit 40 and supplies the recording signal to the signal transmitting ring 26a of the stator core 26 corresponding to the inductive magnetic head 5a at the timing of recording the signal by the inductive magnetic head 5a and to the signal transmitting ring 26b of the stator core 26 corresponding to the inductive magnetic head 5b at the timing of recording the signal by the inductive magnetic head 5b.

Here, the pair of inductive magnetic heads 5a and 5b record the signals alternately with a phase difference of 180° because the inductive magnetic heads 5a and 5b are disposed so as to make the angle of 180° with respect to the center of the rotary drum 3 as described above. That is, the recording amplifier 41 switches the timing of supplying the recording signal to one inductive magnetic head 5a and the timing of supplying the recording signal to the other inductive magnetic head 5b with the phase difference of 180°.

Then, the recording signal supplied to the signal transmitting ring 26a of the stator core 26 corresponding to one inductive magnetic head 5a is transmitted to the signal transmitting ring 27a of the rotary core 27 in non-contact. The recording signal transmitted to the signal transmitting ring 27a of the rotary core 27 is then supplied to the inductive magnetic head 5a which records the signal to the magnetic tape 7.

In the same manner, the recording signal supplied to the signal transmitting ring 26b of the stator core 26 corresponding to the other inductive magnetic head 5b is transmitted to the signal transmitting ring 27b of the rotary core 27 in non-contact. The recording signal transmitted to the signal transmitting ring 27b of the rotary core 27 is then supplied to the inductive magnetic head 5b which records the signal to the magnetic tape 7.

An electric current is supplied to the driving coil 31 of the motor 4 at first to drive and rotate the rotary drum 3 in reproducing the signal from the magnetic tape 7 by using the rotary drum unit 1 described above. Then, a high frequency current is supplied from an oscillator 42 to a power drive 43 in the state when the rotary drum 3 is rotated as shown in FIG. 4.

The high frequency current from the oscillator 42 is converted into a predetermined alternating current by the power drive 43 and is then supplied to the power transmitting ring 26d of the stator core 26. The alternating current supplied to the power transmitting ring 26d of the stator core 26 is transmitted to the power transmitting ring 27d of the rotary core 27 in non-contact. Then, the alternating current transmitted to the power transmitting ring 27d of the rotary core 27 is rectified by a rectifier 44 into a direct current to be supplied to a regulator 45 to be set at predetermined voltage.

The electric current whose voltage is set at the predetermined voltage by the regulator 45 is supplied to the pair of magneto-resistance effect type magnetic heads 6a and 6b as a sense current. It is noted that the pair of magneto-resistance effect type magnetic heads 6a and 6b are connected with a reproducing amplifier 46 for detecting signals from the magneto-resistance effect type magnetic heads 6a and 6b and the current from the regulator 45 is supplied also to this reproducing amplifier 46.

Here, the magneto-resistance effect type magnetic heads 6a and 6b comprise the magneto-resistance effect element whose resistance value varies depending on the magnitude of the external magnetic field as described later in detail. Then, the magneto-resistance effect type magnetic heads 6a and 6b are arranged such that the resistance value of the magneto-resistance effect element is changed by the signaling magnetic field from the magnetic tape 7 and such that the change of the voltage appears in the sense current.

The reproducing amplifier 46 detects this change of the voltage and outputs a signal corresponding to the change of the voltage as a reproducing signal. It is noted that the reproducing amplifier 46 outputs a reproducing signal detected by the magneto-resistance effect type magnetic head 6a at the timing of reproducing the signal by one magneto-resistance effect type magnetic head 6a and outputs a reproducing signal detected by the magneto-resistance effect type magnetic head 6b at the timing of reproducing the signal by the other magneto-resistance effect type magnetic head 6b.

Because the pair of magneto-resistance effect type magnetic heads 6a and 6b are disposed so as to make the angle of 180° from each other with respect to the center of the rotary drum 3 as described before, these magneto-resistance effect type magnetic heads 6a and 6b reproduce the signals alternately with the phase difference of 180°. That is, the reproducing amplifier 46 switches the timing of outputting the reproducing signal from the magneto-resistance effect type magnetic head 6a and the timing of outputting the reproducing signal from the magneto-resistance effect type magnetic head 6b with the phase difference of 180°.

Then, the reproducing signals from the reproducing amplifier 46 are supplied to the signal transmitting ring 27c of the rotary core 27 and are transmitted to the signal transmitting ring 26c of the stator core 26 in non-contact. The reproducing signals transmitted to the signal transmitting ring 26c of the stator core 26 are amplified by a reproducing amplifier 47 and are then supplied to an error correcting circuit 48. Then, after implementing an error correcting process by the error correcting circuit 48, the reproducing signals are outputted to the external circuit 40.

It is noted that when the circuits are structured as shown in FIG. 4, the pair of inductive magnetic heads 5a and 5b, the pair of magneto-resistance effect type magnetic heads 6a and 6b, the rectifier 44, the regulator 45 and the reproducing amplifier 46 are mounted in the rotary drum 3 and rotate together with the rotary drum 3. Meanwhile, the recording amplifier 41, the oscillator 42, the power drive 43, the reproducing amplifier 47 and the error correcting circuit 48 are disposed at the stationary part of the rotary drum unit 1 or are set as external circuits constructed separately from the rotary drum unit 1.

Next, the magneto-resistance effect type magnetic heads 6a and 6b mounted in the rotary drum 3 described above will be explained in detail. It is noted that the magneto-resistance effect type magnetic heads 6a and 6b have the same structure except that their azimuth angles are set to be opposite from each other. Then, these magneto-resistance effect type magnetic heads 6a and 6b will be referred to as the magneto-resistance effect type magnetic head 6 in the following description.

Figure 5:
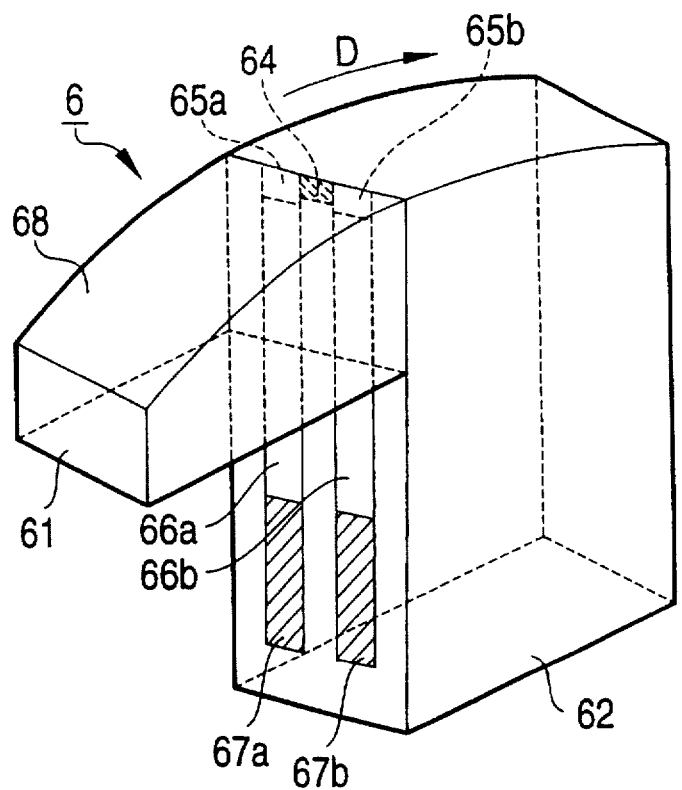
FIG. 5 is a perspective view showing the schematic structure of a magneto-resistance effect type magnetic head mounted in the rotary drum.
Figure 6:
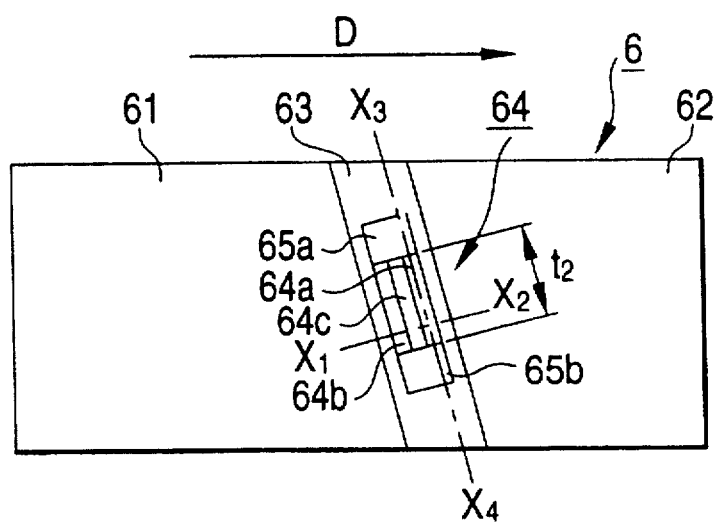
FIG. 6 is a plan view when the magneto-resistance effect type magnetic head is seen from the side of the magnetic tape sliding face thereof.
Figure 7:
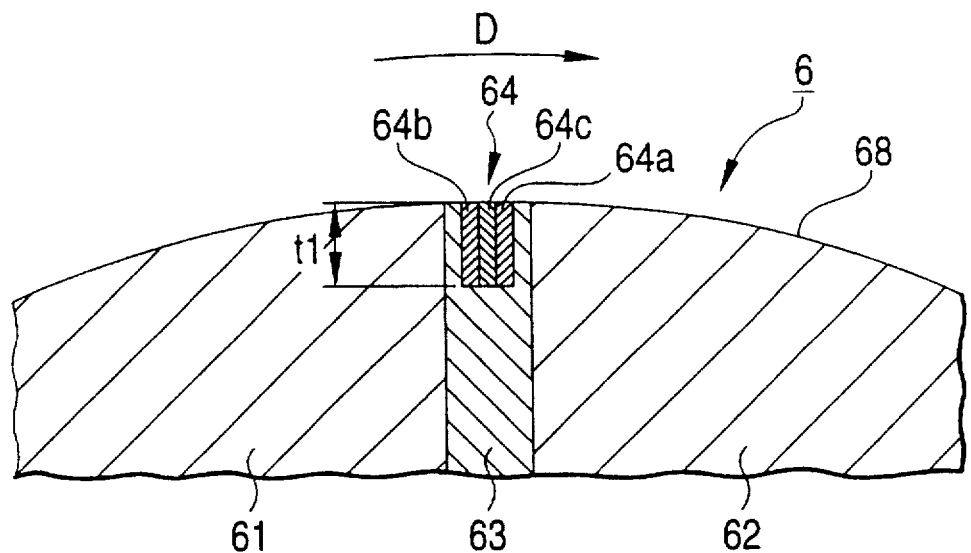
FIG. 7 is a section view taken along a line X1–X2 in FIG. 6 and showing the main part of the magneto-resistance effect type magnetic head.
Figure 8:
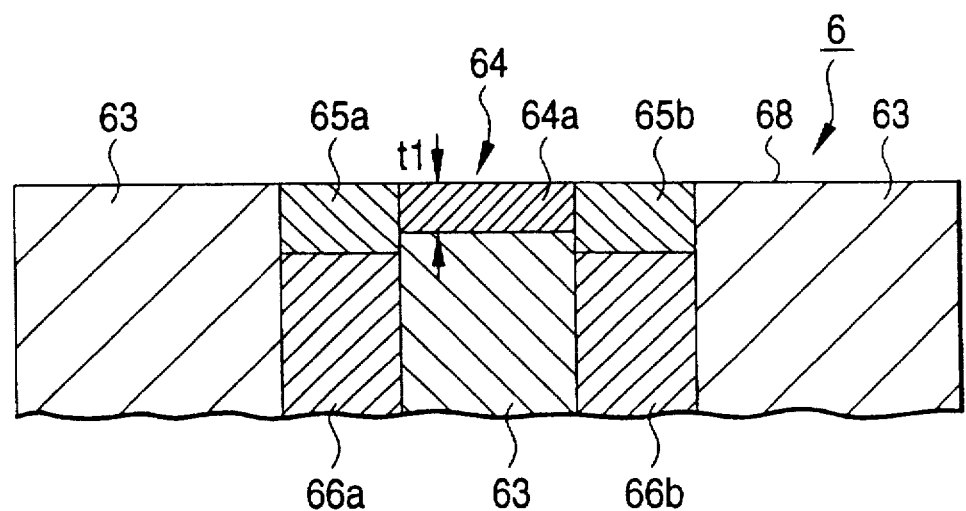
FIG. 8 is a section view taken along a line X3–X4 in FIG. 6 and showing the main part of the magneto-resistance effect type magnetic head.

FIG. 5 is a schematic perspective view of the magneto-resistance effect type magnetic head 6 and FIG. 6 is a plan view when the magneto-resistance effect type magnetic head 6 is seen from the side of the magnetic tape sliding face thereof. FIG. 7 is a section view taken along a line X1–X2 in FIG. 6 and FIG. 8 is a section view taken along a line X3–X4 in FIG. 6.

The magneto-resistance effect type magnetic head 6 is a magnetic head only for reproduction which is mounted in the rotary drum 3 and which detects signals recorded in the magnetic tape 7 by utilizing a magneto-resistance effect in a helical scan method. The magneto-resistance effect type magnetic head is suited for high density recording because its sensitivity is high and its reproduced output is large as compared to an inductive magnetic head which records/reproduces signals by utilizing electromagnetic induction in general. Accordingly, the use of the magneto-resistance effect type magnetic head 6 as the reproduction only magnetic head allows signals to be recorded more densely.

As shown in FIGS. 5 and 6, the magneto-resistance effect type magnetic head 6 comprises a pair of magnetic shields 61 and 62 made of a relatively hard soft magnetic material such as Ni—Zn ferrite and Mn—Zn ferrite, a magneto-resistance effect element 64 sandwiched by the pair of magnetic shields 61 and 62 via an insulating layer 63, permanent magnet films 65a and 65b disposed respectively on the both sides of the magneto-resistance effect element 64, and conductors 66a and 66b connected respectively to the permanent magnet films 65a and 65b. It is noted that FIG. 5 shows the head while omitting the insulating layer 63 and FIG. 6 shows the head by magnifying the magneto-resistance effect element 64 and the nearby part thereof.

In the magneto-resistance effect type magnetic head 6, the magneto-resistance effect film 64 is formed by laminated films which are formed into a rectangular plan shape and is sandwiched by the pair of magnetic shielding members 61 and 62 via the insulating layer 63 so that its short axis direction becomes almost vertical to the magnetic tape sliding face 68 and so that one side thereof is exposed to the magnetic tape sliding face 68. Then, the magneto-resistance effect element 64 is disposed so as to have a predetermined azimuth angle with respect to the sliding direction D of the magneto-resistance effect type magnetic head 6 with respect to the magnetic tape 7 as shown in FIG. 6.

It is noted that the length of the short axis direction of the magneto-resistance effect element 64 (t1 in FIGS. 7 and 8. Hereinafter referred to as a MR height t1) is around 3 to 5 µm for example. The length of the magneto-sensitive section (t2 in FIG. 6) of the magneto-resistance effect element 64 is, for example, around 5 to 8 µm.

The magneto-resistance effect element 64 is formed by laminating a magneto-resistance effect film 64a having a magneto-resistance effect, a SAL (Soft Adjacent Layer) film 64b and an insulating film 64c disposed between the magneto-resistance effect film 64a and the SAL film 64b as shown in FIGS. 6 and 7.

The magneto-resistance effect film 64a is made of a soft magnetic material such as Ni—Fe whose resistance value varies depending on the external magnetic field by its anisotropic magneto-resistance effect (AMR) and its thickness is set at around 40 nm for example. The SAL film 64b is what applies a vertically biased magnetic field to the magneto-resistance effect film 64a by a so-called SAL biasing method and is made of a magnetic material having low coercive force and high permeability such as permalloy. The insulating film 64c insulates the magneto-resistance effect film 64a from the SAL film 64b to prevent electrical diversion loss and is made of Ta having a high resistance phase for example.

The permanent magnet films 65a and 65b are disposed on the both sides of the magneto-resistance effect element 64 as shown in FIGS. 6 and 8. The permanent magnet films 65a and 65b apply a horizontally biased magnetic field to the magneto-resistance effect element 64 and are disposed on the both sides of the magneto-resistance effect element 64 so as to contact therewith in a so-called abutment structure. These permanent magnet films 65a and 65b are made of a magnetic material having large coercive force and conductivity like Co—Ni—Pt and Co—Cr—Pt.

Further, the conductors 66a and 66b connected respectively to the permanent magnet films 65a and 65b are formed on the side of one magnetic shield 62 so as to expose their ends to the outside as terminals 67a and 67b for supplying the sense current from the outside to the magneto-resistance effect element 64. That is, the sense current is supplied to the magneto-resistance effect element 64 from these terminals 67a and 67b via the conductors 66a and 66b and permanent magnet films 65a and 65b.

Figure 9:
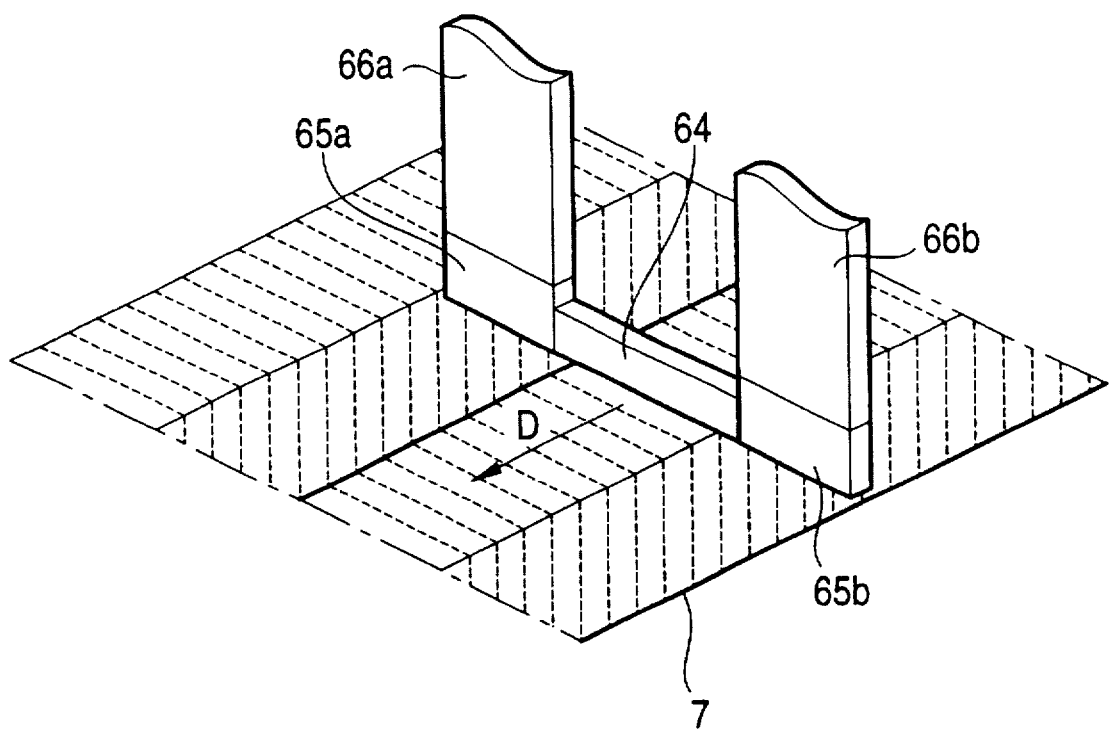
FIG. 9 is a diagrammatic view showing the state of reproducing signals recorded in the magnetic tape by the magneto-resistance effect type magnetic head.

The magnetic tape 7 is slid along the magneto-resistance effect type magnetic head 6 so that the magneto-resistance effect element 64 faces to the magnetic tape 7 as shown in FIG. 9 in reproducing signals recorded in the magnetic tape 7 by using the magneto-resistance effect type magnetic head 6 constructed as described above. It is noted that FIG. 9 is a diagrammatic view showing the state of reproducing the signals by the magneto-resistance effect type magnetic head 6 by magnifying the magnetic tape 7 in which guardbandless recording has been implemented with the predetermined azimuth angle, the magneto-resistance effect element 64 of the magneto-resistance effect type magnetic head 6 sliding on the magnetic tape 7 and the vicinity thereof. An arrow D in FIG. 9 indicates the direction in which the magneto-resistance effect type magnetic head 6 slides with respect to the magnetic tape 7.

The sense current is supplied to the magneto-resistance effect element 64 via the permanent magnet films 65a and 65b connected to the both ends of the magneto-resistance effect element 64 and the conductors 66a and 66b while sliding the magneto-resistance effect type magnetic head 6 on the magnetic tape 7 so that the magneto-resistance effect element 64 faces to the magnetic tape 7 as shown in FIG. 9 in reproducing the signals recorded in the magnetic tape 7. At this time, the resistance value of the magneto-resistance effect element 64 varies corresponding to the magnetic field from the magnetic tape 7 and the voltage of the sense current varies as a result.

Then, the signals recorded in the magnetic tape 7 may be reproduced by detecting the signaling magnetic field from the magnetic tape 7 by detecting the changes of the voltage of the sense current.

Figure 10:
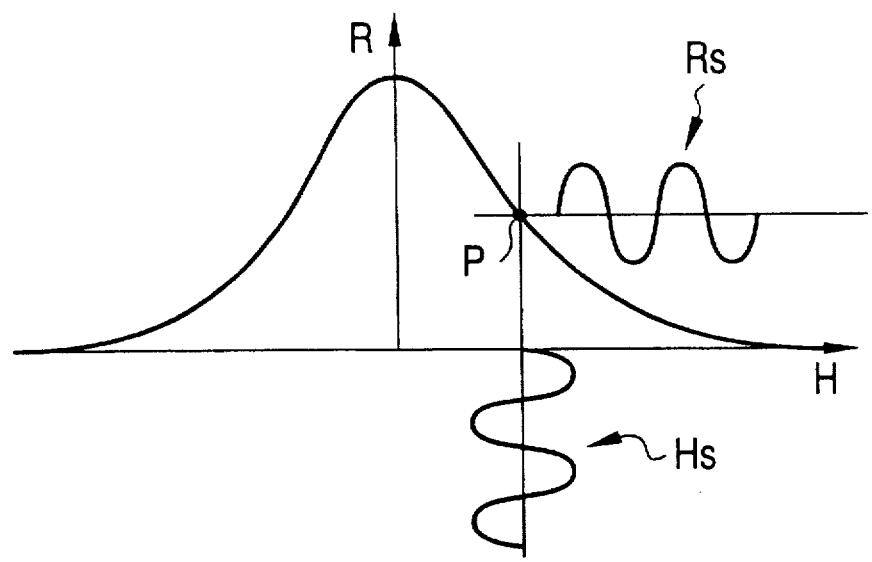
FIG. 10 is a graph showing the relationship among a magnetic resistance curve of a magneto-resistance effect film, a magnetic signal Hs and changes of resistance Rs.

The magneto-resistance effect film 64a in the magneto-resistance effect type magnetic head 6 is a thin film exhibiting the magneto-resistance effect and its resistance value R changes depending on the external magnetic field H as shown in FIG. 10. The magneto-resistance effect type magnetic head 6 reproduces the magnetic signals recorded in the magnetic tape 7 by utilizing such changes of the resistance.

It is noted that the vertically biased magnetic field is applied to the magneto-resistance effect film 64a by the SAL biasing method in the magneto-resistance effect element 64 described above. That is, the vertically biased magnetic field is applied to the magneto-resistance effect film 64a in a manner of amplifying the magnetic field caused by the sense current by the SAL film 64b in the magneto-resistance effect element 64 and a point on a portion of a magneto-resistance curve shown in FIG. 10 where the gradient is the greatest is set as an operating point P of the magneto-resistance effect element 64 by the vertically biased magnetic field.

That is, when the magnetic signal as indicated by Hs in FIG. 10 enters the magneto-resistance effect element 64, changes of the resistance as indicated by Rs in FIG. 10 appear centering on the operating point P. Then, the magneto-resistance effect type magnetic head 6 reproduces the magnetic signal Hs by detecting such changes of the resistance as fluctuation of voltage of the sense current supplied to the magneto-resistance effect element 64.

Figure 11:
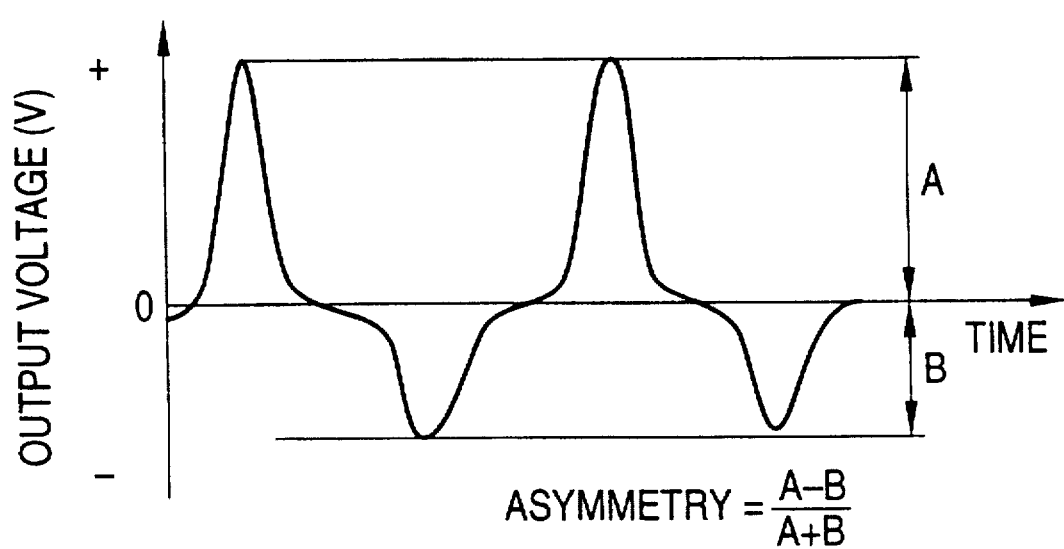
FIG. 11 is a graph showing one example of the fluctuation of voltage of a sense current corresponding to the magnetic signal.

FIG. 11 shows one example of the fluctuation of voltage of the sense current when a magnetic signal in which magnetic fields whose magnitude are equal are repeatedly inverted, i.e., a magnetic signal in which a magnetic field in the normal direction and a magnetic field in the opposite direction appear alternately. As shown in FIG. 11, output voltage V is also inverted as the direction of the magnetic field of the magnetic signal is inverted. The magnetic signal may be reproduced by detecting such fluctuation of voltage.

A voltage fluctuation level A of the sense current caused when the magnetic field in the normal direction is applied to the magneto-resistance effect element 64 is of course desirable to be equal to a voltage fluctuation level B of the sense current caused when the magnetic field in the opposite direction is applied to the magneto-resistance effect element 64. However, these voltage fluctuation levels A and B depend on the magnitude of the vertically biased magnetic field and the voltage fluctuation level A differs from the voltage fluctuation level B depending on the magnitude of the vertically biased magnetic field.

Here, $(A-B)/(A+B)$ will be defined as asymmetry. This asymmetry is a value showing the difference between the voltage fluctuation level A of the sense current caused when the magnetic field in the normal direction is applied to the magneto-resistance effect element 64 and the voltage fluctuation level B of the sense current caused when the magnetic field in the opposite direction is applied. The smaller the absolute value thereof, the smaller the difference between the voltage fluctuation level A and the voltage fluctuation level B is. It is preferable to be smaller.

Figure 12:
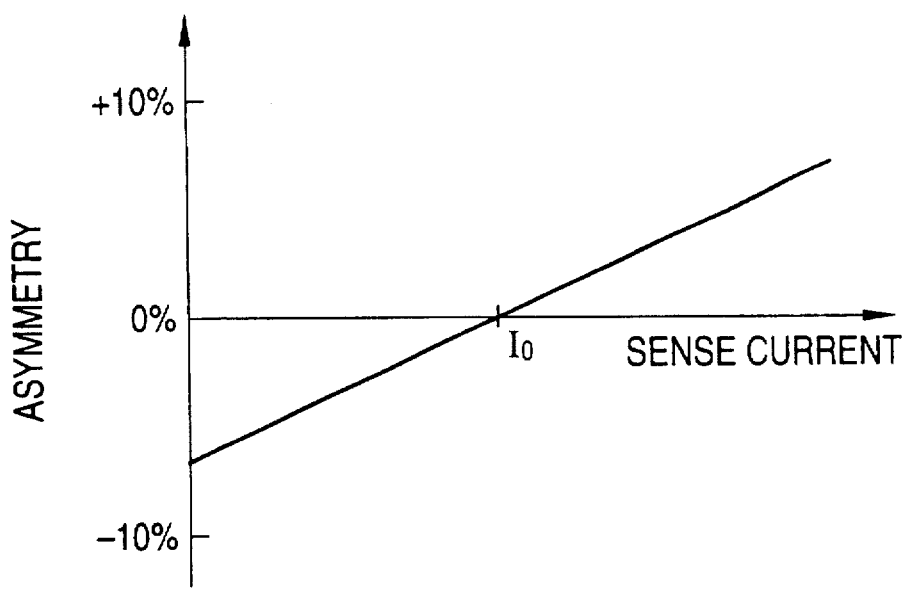
FIG. 12 is a graph showing the relationship between the magnitude of current value of the sense current and asymmetry.

The asymmetry changes depending on the magnitude of the sense current as shown in FIG. 12 in the magneto-resistance effect element 64. That is, the vertically biased magnetic field is applied to the magneto-resistance effect film 64a in the manner of amplifying the magnetic field caused by the sense current by the SAL film 64b in the magneto-resistance effect element 64, so that the magnitude of the vertically biased magnetic field applied to the magneto-resistance effect film 64a changes depending on the magnitude of the sense current and the asymmetry changes as a result.

Here, the current value of the sense current where the asymmetry becomes 0% as shown in FIG. 12 will be defined as I0 in the state when the magnetic tape sliding face 68 of the magneto-resistance effect type magnetic head 6 is not abraded. In other words, the current value of the sense current when the voltage fluctuation level A of the sense current caused when the magnetic field in the normal direction is applied to the magneto-resistance effect element 64 of the magneto-resistance effect type magnetic head 6 is equal with the voltage fluctuation level B of the sense current caused when the magnetic field in the opposite direction is applied will be defined as I0.

Then, the current value of the sense current supplied to the magneto-resistance effect element has been set at I0 in the past so that the asymmetry becomes 0%. In contrary to that, the current value of the sense current supplied to the magneto-resistance effect element 64 of the magneto-resistance effect type magnetic head 6 in reproducing the magnetic signals recorded in the magnetic tape 7 is set to be greater than I0 in the magnetic signal reproducing apparatus to which the invention is applied. More concretely, it is set at 1.2 to 1.4 times of I0.

The fluctuation of the reproduced output may be lessened even if the magnetic tape sliding face 68 of the magneto-resistance effect type magnetic head 6 is abraded by setting the current value of the sense current supplied to the magneto-resistance effect element 64 to be greater than I0. The reason thereof will be explained below.

Figure 13:
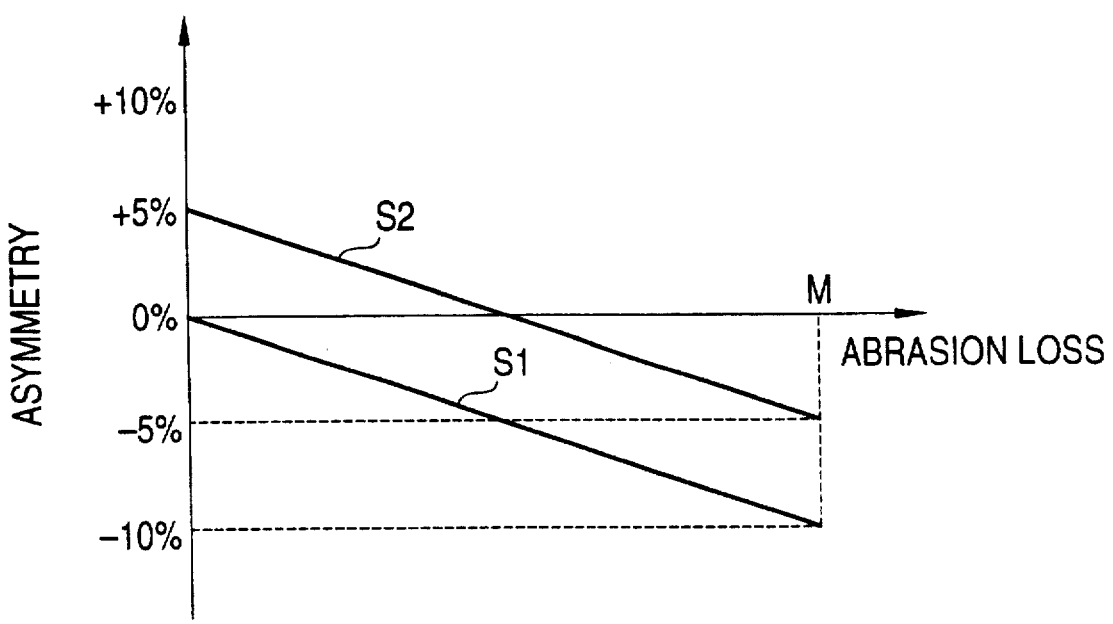
FIG. 13 is a graph showing the relationship between the abrasion loss of the magnetic tape sliding face of the magneto-resistance effect type magnetic head and the asymmetry.

When the magnetic tape sliding face 68 of the magneto-resistance effect type magnetic head 6 is abraded, the MR height t1 of the magneto-resistance effect element 64 becomes small and the resistance value of the magneto-resistance effect element 64 increases. As a result, the magnitude of the vertically biased magnetic field applied to the magneto-resistance effect film 64a by the SAL biasing method changes and the asymmetry changes as a result. FIG. 13 shows one example of this state.

It is noted that a solid line S1 in FIG. 13 shows the case when the current value of the sense current is set so that the asymmetry becomes 0% in the state when the magnetic tape sliding face 68 of the magneto-resistance effect type magnetic head 6 is not abraded. In other words, the solid line S1 in FIG. 13 shows the case when the current value of the sense current is set at I0.

Meanwhile, a solid line S2 in FIG. 13 shows the case when the current value of the sense current is set so that the asymmetry becomes +5% in the state when the magnetic tape sliding face 68 of the magneto-resistance effect type magnetic head 6 is not abraded. In other words, the solid line S2 in FIG. 13 shows the case when the current value of the sense current is set to be greater than I0.

When the current value of the sense current is set at I0, in case of the solid line S1 in FIG. 13, although the asymmetry is 0% when the magnetic tape sliding face 68 of the magneto-resistance effect type magnetic head 6 is not abraded, the asymmetry becomes minus and the absolute value thereof increases gradually as the abrasion progresses.

Meanwhile, when the current value of the sense current is set to be greater than I0, i.e., in case of the solid line S2 in FIG. 13, although the asymmetry is equal to or greater than 0% when the magnetic tape sliding face 68 of the magneto-resistance effect type magnetic head 6 is not abraded, the asymmetry becomes small and becomes 0% in due time as the abrasion progresses. After that, when the abrasion progresses further, the asymmetry becomes minus and its absolute value increases gradually.

Accordingly, even if the fluctuation width of the asymmetry caused by the abrasion is the same, the asymmetry fluctuates in a range in which the absolute value is smaller by setting the current value of the sense current to be greater than I0 as compared to the case of setting the current value of the sense current at I0. That is, in the example shown in FIG. 13, although the asymmetry changes from 0% to −10% in case of the solid line s1 in which the current value of the sense current is set at I0 when a certain degree M is abraded, the asymmetry changes from +5% to −5% in case of the solid line S2 in which the current value of the sense current is set to be greater than I0.

As described above, the change of the asymmetry may be kept as the change in the range in which the absolute value is small by setting the current value of the sense current to be greater than I0 even if the asymmetry changes due to the abrasion of the magnetic tape sliding face 68 of the magneto-resistance effect type magnetic head 6. In other words, it is advantageous to set the current value of the sense current to be greater than I0, rather than setting the current value of the sense current at I0, and the fluctuation of the reproduced output caused when the magnetic tape sliding face 68 of the magneto-resistance effect type magnetic head 6 is abraded may be kept small.

It is noted that in setting the current value of the sense current to be greater than I0, it is preferable to set the magnitude of the current value of the sense current such that the absolute value of the asymmetry in the initial state in which the magnetic tape sliding face 68 of the magneto-resistance effect type magnetic head 6 is not abraded is almost equal to the absolute value of asymmetry when the abrasion of the magnetic tape sliding face 68 of the magneto-resistance effect type magnetic head 6 reaches to a tolerance limit.

Here, the current value of the sense current when the asymmetry becomes 0% when the abrasion of the magnetic tape sliding face 68 of the magneto-resistance effect type magnetic head 6 reaches to the tolerance limit will be denoted as Is. The tolerance limit of the abrasion is about 50% of the MR height t1 in the initial state, i.e., about the degree where the MR height t1 of the magneto-resistance effect element 64 becomes a half, because noise contained in the reproduced output from the magneto-resistance effect type magnetic head 6 increases when the MR height t1 of the magneto-resistance effect element 64 becomes small due to the abrasion of the magnetic tape sliding face 68 of the magneto-resistance effect type magnetic head 6.

Then, when the MR height t1 becomes a half, the current value of the sense current where the asymmetry becomes 0% is about 1.5 to 2.0 times of I0. That is, the current value Is of the sense current when the asymmetry becomes 0% when the abrasion reaches to the tolerance limit is about 1.5 to 2.0 times of I0.

Then, the absolute value of the asymmetry in the initial state when the magnetic tape sliding face 68 of the magneto-resistance effect type magnetic head 6 is not abraded becomes almost equal with the absolute value of the asymmetry when the abrasion of the magnetic tape sliding face 68 of the magneto-resistance effect type magnetic head 6 reaches to the tolerance limit by setting the current value of the sense current at $Is^{1/2}$ in advance. Accordingly, it is preferable to set the current value of the sense current at around 1.2 to 1.4 times of I0.

That is, the change of the asymmetry may be kept as the change within the range in which the absolute value is particularly small and the fluctuation of the reproduced output which occurs when the magnetic tape sliding face 68 of the magneto-resistance effect type magnetic head 6 is abraded may be kept small by setting the current value of the sense current supplied to the magneto-resistance effect element 64 of the magneto-resistance effect type magnetic head 6 at about 1.2 to 1.4 times of I0.

As described above in detail, as the magnetic signal reproducing apparatus for reproducing magnetic signals recorded in a magnetic tape by the magneto-resistance effect type magnetic head, the invention can provide the magnetic signal reproducing apparatus which causes less fluctuation of the reproduced output even when the magnetic tape sliding face of the magneto-resistance effect type magnetic head is abraded.

Furthermore, as a magnetic signal reproducing method for reproducing the magnetic signals recorded in the magnetic tape by the magneto-resistance effect type magnetic head, the invention can provide the magnetic signal reproducing method which causes less fluctuation of the reproduced output even if the magnetic tape sliding face of the magneto-resistance effect type magnetic head is abraded.

While the preferred embodiment has been described, variations thereto will occur to those skilled in the art within the scope of the present inventive concepts which are delineated by the following claims.

What is claimed is:

1. A magnetic signal reproducing apparatus, comprising:

a magneto-resistive effect type magnetic head having a magneto-resistive effect element that is subject to abrasive wear from an initial state; and a sense current supplying section for supplying a sense current to said magneto-resistive effect element, wherein a value of the sense current supplied to said magneto-resistive effect element from said sense current supplying section is set to be greater than a predetermined value of sense current I0 whereat an asymmetry of said magneto-resistive effect element, caused by a difference between a detected voltage level of the sense current when a magnetic field in a predetermined direction is applied to the magnetic-resistive effect element and a detected voltage level of the sense current when the magnetic field in a direction opposite to said predetermined direction is applied, in the initial state is zeroed.

2. The magnetic signal reproducing apparatus according to claim 1, wherein the value of sense current supplied from said sense current supplying section to said magneto-resistive effect element is set a t 1.2 to 1.4 times the predetermined value I0.

3. A magnetic signal reproducing apparatus according to claim 1, wherein said magneto-resistive effect type magnetic head is mounted in a rotary drum.

4. A magnetic signal reproducing method for reproducing magnetic signals recorded in a magnetic tape by a magneto-resistive effect type magnetic head that is subject to abrasive wear from an initial state that reproduces the magnetic signals, the method comprising the steps of:

supplying a sense current to a magneto-resistive effect element of the magnetic head;

detecting a fluctuation of a voltage of said sense current; and selecting a value of the sense current supplied to said magneto-resistive effect element to be greater than a predetermined value of the sense current I0 whereat an asymmetry of the magneto-resistive effect element, caused by a difference between a detected voltage level of the sense current when a magnetic field in a predetermined direction is applied to the magnetic-resistive effect element and a detected voltage level of the sense current when the magnetic field in a direction opposite to said predetermined direction is applied, in the initial state is zeroed.

5. The magnetic signal reproducing method according to claim 4, wherein the value of sense current supplied to said magneto-resistive effect element is selected to be greater than the predetermined value I0 by 1.2 to 1.4 times.

6. The magnetic signal reproducing method according to claim 4, further comprising the steps of:

mounting said magneto-resistive effect type magnetic head in a rotary drum; and reproducing the magnetic signals recorded in the magnetic tape by means of a helical scan method.

* * * * *